March 12, 1963  F. K. H. NALLINGER  3,080,948
VEHICLE BRAKE
Filed Oct. 20, 1958
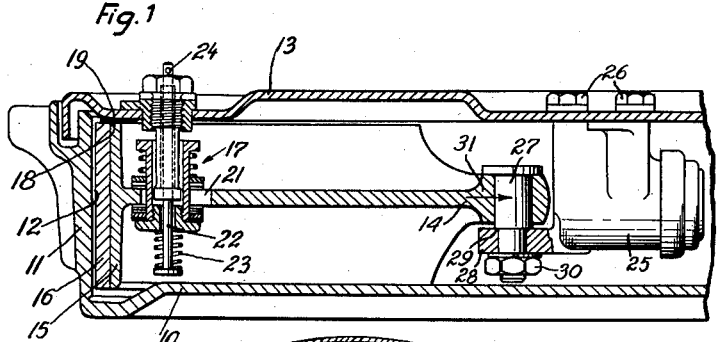
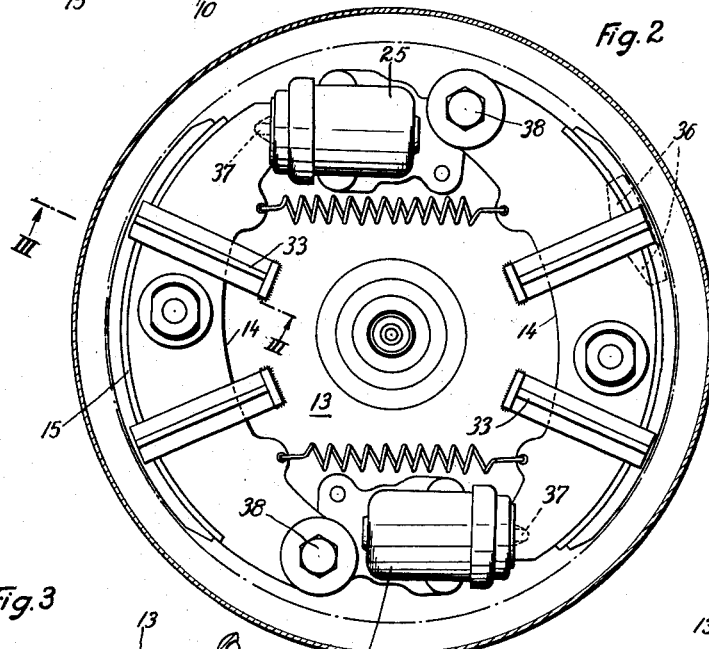
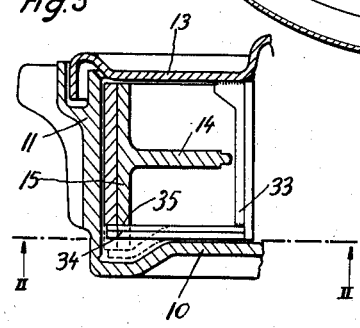 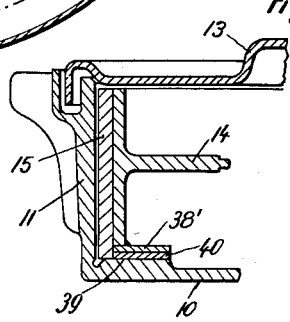
Inventor
FRIEDRICH K. H. NALLINGER
BY
ATTORNEYS.

United States Patent Office 3,080,948
Patented Mar. 12, 1963

3,080,948
VEHICLE BRAKE
Friedrich K. H. Nallinger, Stuttgart, Germany, assignor to Daimler-Benz Aktiengesellschaft, Stuttgart-Unterturkheim, Germany
Filed Oct. 20, 1958, Ser. No. 768,370
Claims priority, application Germany Oct. 23, 1957
10 Claims. (Cl. 188—78)

My invention relates to a vehicle brake of the type comprising a rotary drum-shaped member and brake shoes disposed inside thereof and carried by a non-rotatable supporting member. More particularly, my invention is applicable to a servo-brake of this type.

Brakes of this type are frequently liable in operation to produce a very disagreeable screeching noise which is believed to be caused by vibrations of the brake shoes and of the brake drum. It is the object of my invention to produce an improved vehicle brake of the type defined hereinabove in which the development of such noise will be effectively suppressed. More particularly, it is an object of my invention to provide a simple and effective means for preventing vibrations of the brake shoes or at least for considerably dampening such vibrations. It is another object of my invention to increase the total area of the braking surfaces.

Further objects of my invention will appear from a detailed description of a number of various embodiments thereof illustrated in the accompanying drawing. I wish it to be clearly understood, however, that my invention is in no way restricted to the details of such embodiments but is capable of numerous modifications within the scope of the appended claims and that the terms and phrases used in such detailed description have been chosen for the purpose of explaining the invention rather than that of restricting or limiting the same.

In the accompanying drawing

FIG. 1 is a partial diametrical section of a preferred embodiment of my improved brake, FIG. 2 is a sectional view of another embodiment of my invention, the section being taken along the plane indicated by line II—II of FIG. 3, FIG. 3 is a partial diametrical section taken along the line III—III of FIG. 2, and FIG. 4 is a sectional view similar to that of FIG. 3 of still another embodiment of my invention.

The vehicle brake illustrated in FIG. 1 comprises a drum-shaped member 10, 11, a pair of brake shoes disposed inside the drum-shaped member for engagement with the inner peripheral face 12 thereof, and a supporting member 13 which movably carries the brake shoes. The drum-shaped member is composed of one end-wall 10 and a peripheral wall 11. Each of the brake shoes comprises a substantially flat web 14 and an arcuate flange 15 which is integral with the web 14 and is provided with a brake lining 16. Suitable means, such as a plunger operable by fluid pressure, is connected with the web 14 for urging the brake shoe outwardly into engagement with the inner peripheral face 12. The support 13 is formed by a disk-shaped sheet metal member and carries a conventional automatic adjusting device 17 which is well known in the art and need not be described as it does not form part of my invention.

For the purpose of preventing vibration of the brake shoes suitable means are provided for axially bracing the brake shoes, when urged outwardly against the face 12, by engagement of the inner side 18 of the brake shoe with the supporting member 13. Preferably, the support 13 includes a sheet metal member, such as an annular disk 19, which is rigidly fixed to the member 13 and engages the arcuate flange 15 of the brake shoe. The bracing effect may be attained by resilient means acting on the brake shoes and urging same towards the supporting member 13. The annular sheet metal disk 19 has a plane face extending transversely to the axis of the rotary drum-shaped member 10, 11 for engagement by the side face 18 of each brake shoe. The web 14 is provided with a hole 21 and a pin 22 is fixed to the support 13 and extends through the hole 21. A helical spring 23 surrounding the end of the pin 22 and braced against a head of the pin 22 exerts axial pressure upon the brake shoe holding same in engagement with the sheet metal disk 19. The pin 22 may be disposed coaxially within the automatic adjusting device 17 or at any other location.

The pin 22 may be fixed to the supporting member 13 by suitable means including a pin 24.

When the brake shoes carried by the non-rotary supporting member 13 are urged outwardly into engagement with the internal face 12 of the rotary brake drum, the side faces 18 of the brake shoes are kept by the springs 23 in engagement with the sheet metal disks 19, thus preventing any lateral oscillations or vibrations of the brake shoes. Suitable means may be provided for axial adjustment of the pin 22 on the support 13 to thereby vary the tension of spring 23. Each brake shoe may be provided with a plurality of holes, such as 21, and with pins, such as 22, extending therethrough.

Webs 14 are also secured to the support 13 by suitable means, such as a plurality of screws 26, and a pin 27 fixed to each motor 25 and extending parallel to the axis of the drum 10, 11 in cantilever fashion. Each brake shoe is pivotally mounted on one such pin 27. More particularly, each motor 25 is provided with an arm 28 extending parallel to the support 13 in spaced relationship thereto and the pin 27 extends through a bore of the arm 28 and has a shoulder 29 held in engagement with the arm 28 by a nut 30 screwed upon the threaded end of the pin. The web 14 is provided with an eye journaled on the free end of the pin 27. The motor 25 may be formed with a cylindrical bore accommodating a plunger for the actuation of the adjacent brake shoe in the conventional manner.

When the brake shoe is urged against the internal face 12 of the rotary brake drum, the reactionary force exerted by the brake drum upon the brake shoe causes the latter to press against the pin 27 in the direction indicated by the arrow 31 and this reactionary force tends to flex the pin 27 and the arm 28 in the direction of the arrow 31. As a result of such flexure the brake shoe tends to assume an askew position and the force exerted by the pin 27 upon the brake shoe has an axially directed component urging the brake shoe into engagement with the annular sheet metal disk 19. Hence, the braking force itself produces, when spring 23 is omitted or increases when spring 23 is used, the effect which has been described above as being produced by the spring 23, namely to provide a force for maintaining the side faces 18 of the brake shoes in engagement with sheet metal disk 19. Spring 23 and the braking force may obviously be used independently to also produce this effect.

Whereas in the embodiment shown in FIG. 1 the opposed faces indicated at 18 and 19 are provided on the support 13 and on those sides of the brake shoes as are remote from the end-wall 10 of the rotary brake drum, FIGS. 2 and 3 illustrate an embodiment in which the opposed faces are provided on those sides of the brake shoes as are adjacent to the end-wall 10 and on portions of the support 13 which extend into the drum and across the brake shoes on the inside thereof.

As shown in FIGS. 2 and 3, the support 13 is formed with two pairs of portions 33, one such pair being provided for each brake shoe, each portion extending from the support 13 into the brake drum and across the brake shoe 14, 15 on the inside thereof past the web 14. The ends 34 of the portions 33 are provided with plane side faces 35 disposed in opposed relationship and for engagement with the side face of the flange 15 of the brake shoe. The portions 33 may be formed by angle bars which are welded to the support 13 and to each other. However, the portions 33 may be detachably connected with the support 13, for instance by suitable screws, where that is desirable to facilitate the assembly. The ends 34 of the portions 33 may have an increased width in order to increase the area of the bracing faces as diagrammatically indicated at 36 by dotted lines in FIG. 2.

Each brake shoe 14, 15 is pivotally mounted on a pin 38 which is fixed to the support 13 and extends therefrom in cantilever fashion parallel to the axis of the brake drum. When each brake shoe 14, 15 is urged by the plunger 37 under fluid pressure against the inner peripheral surface 12 of the brake drum, the bearing pin 38 is slightly flexed, whereby a force is exerted upon the brake shoe having an axial component urging the brake shoe outwardly in a direction towards the end-wall 10 of the brake drum. This component, therefore, keeps the brake shoe in firm engagement with the ends 34, or 36 respectively, of the portions 33 of the support 13, thus preventing any vibration of the brake shoes. If desired, the ends 34 of the portions 33 may be offset in conformity with the profile of the end-wall 10 of the drum as indicated by dotted lines in FIG. 3.

Compared with the embodiment shown in FIG. 1, the embodiment illustrated in FIG. 2 offers the advantage that the brake shoes 14, 15 may be mounted upon the support 13 in the conventional manner rather than by means of the motors 25 which are especially provided for the purpose of the present invention.

In the embodiment illustrated in FIG. 4 the brake drum 10, 11 and the brake shoes are provided with opposed faces extending transversely to the axis of the drum for engagement. For this purpose flat sheet metal strips 38' are welded or otherwise secured to those edges of the flanges 15 of the brake shoes as are disposed adjacent to the end-wall 10 of the drum and this end-wall is provided with a brake lining 40 mounted on a flat face 39 for cooperation with the strip 38'.

The function is similar to that of the embodiment illustrated in FIGS. 2 and 3. Under the effect of the reactionary force exerted by the brake drum upon the brake shoes in the braking operation, the strips 38' fixed to the brake shoes are caused to bear against the brake lining 40 of the brake drum. In this manner the effective braking area of the brake is increased considerably. If it is desired, however, to avoid the additional braking effect, the brake lining 40 may be omitted so that the strips 38' will directly engage the plane face 39 of the side wall 10 of the brake drum.

Preferably, the side faces of the brake shoes, such as 18, are provided on the flanges 15 substantially coextensive with the peripheral length of the flange. If desired, however, the lateral faces of the brake shoes, such as the face 18, may be interrupted, so that the brake shoe will engage the opposed face 19 or 39 at spaced points only.

Preferably, the width of the brake shoes is so chosen that the lateral clearance of the brake shoes on the inside and on the outside is a minimum, such clearance depending on the amount of the natural flexure of the bearing pins 27 and 38.

If desired, means may be provided affording a possibility of adjusting such clearance from the outside. As such means can be readily provided by anyone skilled in the art, a detailed description thereof is deemed dispensable herewith.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A vehicle brake comprising a brake drum having one end-wall and a peripheral wall, brake shoes disposed inside said drum for engagement with the inner peripheral face thereof, a support member for movably supporting said brake shoes, bracket means fixed to said support member and extending into said drum, pins fixed to said bracket means and extending parallel to the axis of said drum in cantilever fashion towards said support member, each brake shoe being pivotally mounted on one of said pins, and means connected with said brake shoes for urging same outwardly into engagement with said inner peripheral face, opposed faces being provided on said support member and on the sides of said brake shoes remote from said end-wall for engagement, when said means is operative to urge said brake shoes outwardly.

2. A vehicle brake comprising a drum-shaped member, brake shoes disposed within said drum-shaped member and having an inner and an outer face with respect to said drum-shaped member and a peripheral face adapted for engagement with the inner peripheral face of said drum-shaped member, a supporting member movably carrying said brake shoes, means connected with said brake shoes at one end thereof for urging the same outwardly into engagement with said inner peripheral face, said brake shoes and one of said members having opposed faces extending transversely to the axis of said drum-shaped member, the opposed faces on said brake shoes being arranged on one of the said inner and outer faces thereof, and means providing an engaging force for engagement of said opposed faces to thereby dampen vibrations of the brake shoes when said first-mentioned means is operative to urge said brake shoes outwardly, said last-mentioned means comprising means pivotally supporting said brake shoes from said supporting member and at the other end of said brake shoes, said supporting means effectively supporting said brake shoes at only the other one of the said inner and outer faces of said brake shoes.

3. A vehicle brake comprising a brake drum, at least one brake shoe disposed inside said drum for engagement with the inner peripheral face thereof, said brake shoe having two sides spaced in the axial direction of said drum, a support member, support means for movably attaching said brake shoe to said support member including pin means extending essentially parallel to the axis of said drum in cantilever fashion, said pin means being supported by said support means adjacent one of said two sides and having a free end extending toward the other of said two sides, said brake shoe being pivotally mounted on said free end of said pin means, and means connected with said brake shoe for urging the same outwardly of said drum into engagement with said inner peripheral face thereof, said brake shoe and one of said support member and said brake drum being provided with opposed faces on that side of the brake shoe toward which said free end of the pin means extends, said opposed faces extending essentially transversely to the axis of said drum, whereby when said means urging said brake shoe is operative to urge said shoe outwardly for engagement with said inner peripheral face an engaging force is produced for engagement of said opposed faces to thereby dampen vibrations of said brake shoe.

4. A vehicle brake as defined in claim 3, wherein said brake drum comprises one end wall and a peripheral wall, said two sides of said brake shoe comprising inner and outer sides thereof with respect to said one end wall, said one side being the inner side.

5. A vehicle brake as defined in claim 3, further comprising second pin means for providing an engaging force to keep said opposed faces in engagement with each other including pins fixed to said support member and extending through holes provided in said brake shoe, and springs mounted on said pins and operatively engaging said one side of said brake shoe whereby to provide said engaging force for keeping said opposed faces in engagement with each other.

6. A vehicle brake as defined in claim 3, wherein said brake drum comprises one end wall and a peripheral wall, said two sides of said brake shoe comprising inner and outer sides thereof with respect to said one end wall, and wherein said support member includes at least one L-shaped member having one end secured to the support member and the other end of said L-shaped member extending into said drum and across said brake shoe on the inside thereof between said inner side of said brake shoe and said end wall of said drum, said opposed faces being provided on the inner side of said brake shoe and on said L-shaped member.

7. A vehicle brake as defined in claim 3, wherein said brake drum comprises one end wall and a peripheral wall, said two sides of said brake shoe comprising inner and outer sides thereof with respect to said one end wall, said opposed faces being provided on said one end wall of said drum and said inner side of said brake shoe.

8. A vehicle brake as defined in claim 3, wherein said brake drum comprises one end wall and a peripheral wall, said two sides of said brake shoe comprising inner and outer sides thereof with respect to said one end wall, said opposed faces being provided on said support member and said inner side of said brake shoe.

9. A vehicle brake comprising a brake drum having one end wall and a peripheral wall, at least one brake shoe disposed inside said drum for engagement with the inner peripheral face thereof, said brake shoe having a substantially flat web and an arcuate flange integral with said web, said web and said flange having inner and outer sides with respect to said one end wall and said web having an outer peripheral face, a brake lining secured to said outer peripheral face and adapted to engage said inner peripheral face of said drum, a support member, support means, for movably attaching said brake shoe to said support member including bracket means fixed to said support member and extending into said drum and a pin secured to said bracket means and extending essentially parallel to the axis of said drum in cantilever fashion, said pin being supported by said bracket means adjacent one of said two sides and having a free end extending toward the other of said two sides, the web of said brake shoe being pivotally mounted on said free end of said pin means, and means connected with said brake shoe for urging the same outwardly into engagement with said inner peripheral face, said support member and the flange of said brake shoe being provided with opposed faces on that side of the brake shoe toward which the free end of said pin extends, said opposed faces extending essentially transversely to the axis of said drum, said support means producing an engaging force when said means urging said brake shoe is operative to urge said shoe outwardly for engagement of said opposed faces to thereby dampen vibrations of said brake shoe.

10. A vehicle brake as claimed in claim 9, wherein said opposed faces are provided on said support member and said outer side of the brake shoe flange, and, further comprising second pin means for providing an additional force for bringing said opposed faces into engagement with each other including pins fixed to said support member and extending through holes provided in said brake shoe webs and springs mounted on said support pins and operatively engaging said brake shoe webs at the inner side thereof to provide said additional force for bringing said opposed faces in engagement with each other.

References Cited in the file of this patent

UNITED STATES PATENTS

| 1,875,989 | Charles | Sept. 6, 1932 |
| 2,084,388 | Dodge | June 22, 1937 |
| 2,139,286 | Russell | Dec. 6, 1938 |
| 2,140,385 | Hunt et al. | Dec. 13, 1938 |
| 2,167,706 | Berno | Aug. 1, 1939 |
| 2,418,848 | Perrot | Apr. 15, 1947 |
| 2,852,105 | House et al. | Sept. 16, 1958 |

FOREIGN PATENTS

| 306,269 | Great Britain | Feb. 21, 1929 |
| 821,298 | Great Britain | Oct. 7, 1959 |